Figure 1:
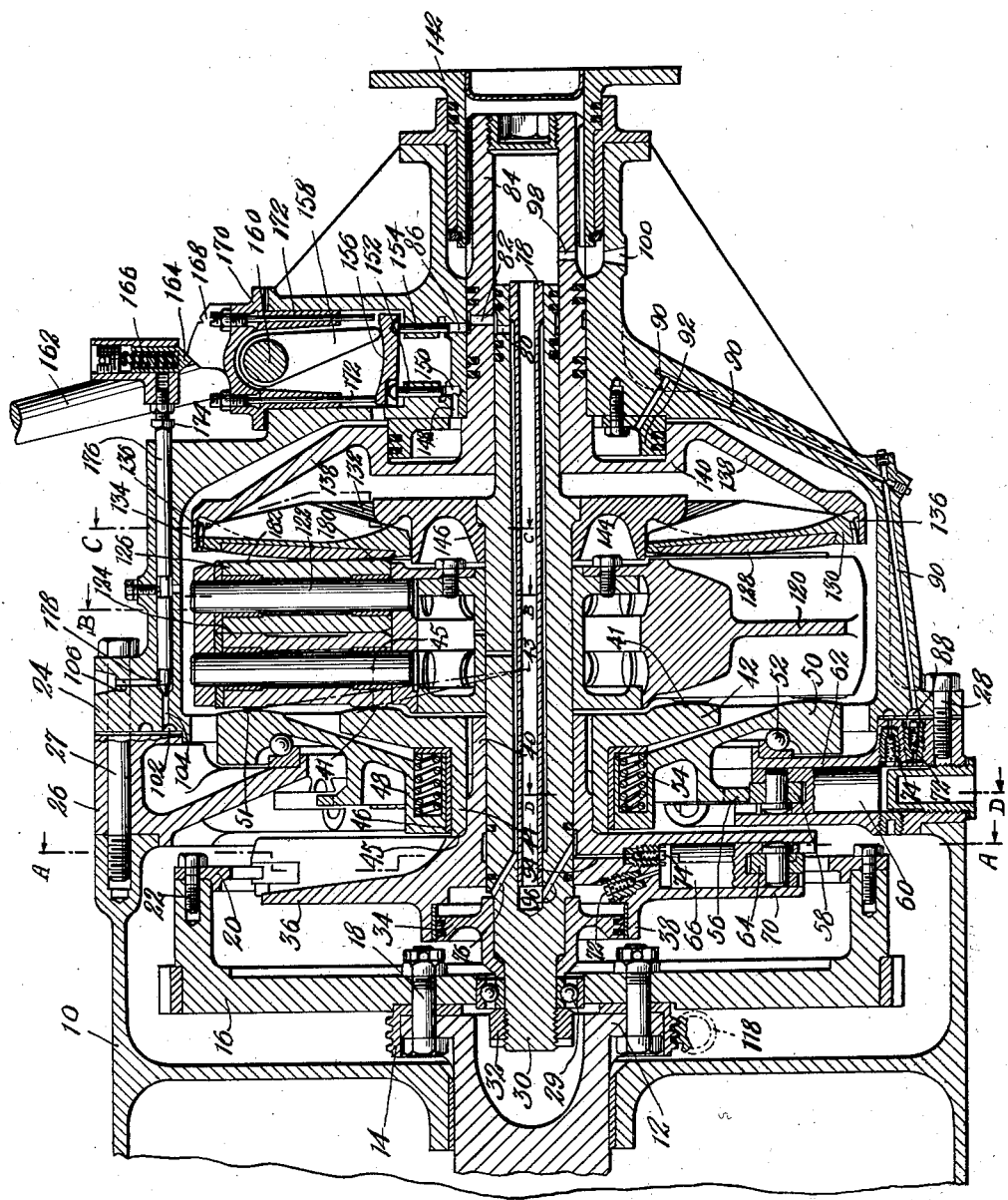

May 19, 1936.  R. CHILTON  2,040,831

TRANSMISSION

Filed Sept. 5, 1934  2 Sheets-Sheet 2

INVENTOR
ROLAND CHILTON
BY
ATTORNEY

Patented May 19, 1936

2,040,831

UNITED STATES PATENT OFFICE 2,040,831

TRANSMISSION

Roland Chilton, Ridgewood, N. J.

Application September 5, 1934, Serial No. 742,752

17 Claims. (Cl. 74—281)

My invention relates to variable speed transmissions of the type wherein smooth driving members are loaded into non-slipping rolling driving contact. In certain aspects the invention may be said to constitute a continuing development of that type of transmission described and illustrated in my co-pending applications, Serial Numbers 669,144 and 728,058.

The objects and advantages of the invention are generally the same as the stated objects and advantages of application Serial No. 742,751 filed concurrently herewith. Structurally, however, the present invention and the invention of said companion application are dissimilar. Whereas in said companion application the planet rollers are organized for tilting action in a cage against a rigid driven member to effect a ratio change, said rollers, in the present case, are provided with non-tilting axes, and the rocking action essential to a ratio change is obtained through a distortable driven member adapted for ratio-change movement under the action of controlled hydraulic pressure. Moreover, instead of a fixed pressure thrust means similar to that disclosed in said companion application, the instant case contemplates the use of controllable contact pressure thrust means plus control means adapted to proportion the hydraulic pressure to which said thrust means are subjected.

Figure 2:
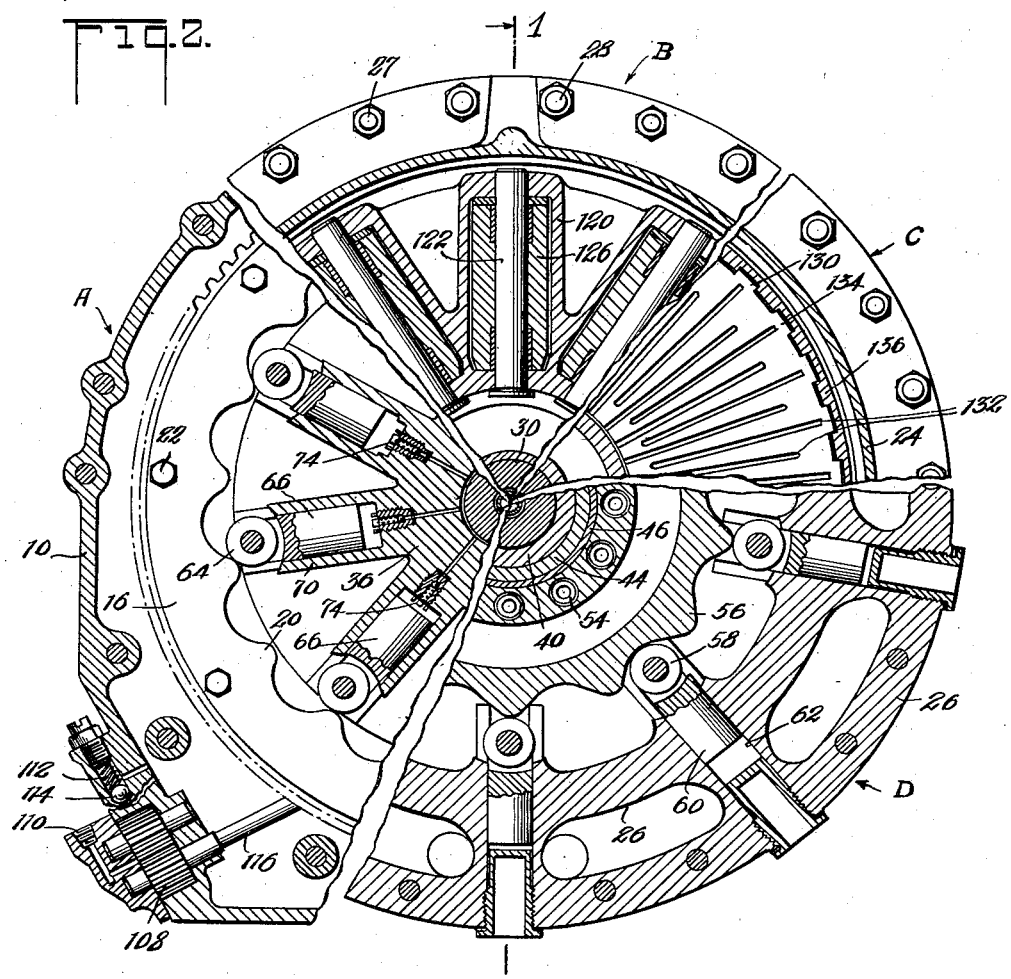

In the drawings:

Fig. 1 is an axial section on the line 1—1 of Fig. 2;

Fig. 2 comprises segmental transverse sections as follows:

Segment A is a section on the line a—a of Fig. 1;

Segment B is a section on the line b—b of Fig. 1;

Segment C is a section on the line c—c of Fig. 1;

Segment D is a section on the line d—d of Fig. 1; and

Figure 3:
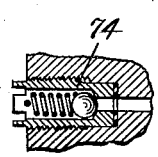

Fig. 3 is a spring loaded non-return valve shown enlarged.

Referring first to Fig. 1, 10 designates the crankcase of an engine to which the transmission of this invention is attached, and which engine has the usual crankshaft flange 12 to which is attached a helical pump driving gear 14 and a conventional flywheel 16 as by bolts 18. An internal cam ring 20, seen also in segment A of Fig. 2, is secured to the flywheel by screws 22.

Between the engine case 10 and the main transmission housing 24 there is secured a fixed pump body member 26 by screws 27 and 28, the former extending through the housings 26 and 24 and into the housing 10.

Slidable axially in a suitable bore in the flywheel 16 is a pilot bearing 29 secured on a transmission shaft 30 by a nut 32 which also secures a piston 34. Mounted for free rotation on the shaft 30 is a driving pump body member 36, having a cylindrical extension 38 comprising a cylinder in which the piston 34 is rotatable and axially slidable. The rotary pump member 36 has an extension sleeve 40 and to this extension there is splined a driving member 42, having a sleeve 44 abutting a shoulder 45 formed on the member 36.

A rotationally free bushing 46 mounts the hub 48 of a reaction member 50 upon the sleeve 44. This reaction member is free for rotational creepage, being maintained in contact with an anti-friction thrust bearing 52 abutting the stationary member 26 by axial pressure of springs 54 engaging the head of the bushing 46 as shown, and urging the driving member 42 to the right.

The reaction member 50 is provided with external cams 56 (seen also in segment D, Fig. 2). Engaged with the cams 56 of the reaction member 50 are rollers 58 of pump plungers 60 slidable in cylinders 62 formed in the fixed pump body 26.

Similarly engaged with the driving cam 20 on the flywheel 16 are rollers 64 of pump plungers 66 engaged in cylinders 70 formed in the driving pump body 36. The pump assemblage 20, 36, 64, 66, and 70 constitutes the driving connection between the flywheel 16 and the driving member 42. Similarly, the pump assemblage 58, 60, 62, and 56 constitutes the means by which the torque reactions on the reaction member 50 are resisted. Each pump cylinder is provided with a delivery valve 72 and an intake valve 74, these valves being automatic one-way spring-loaded check valves of the type illustrated in Fig. 3.

The delivery valves 72 of the driving pump cylinders 70 deliver directly to the piston 34 behind which there is drilled a diagonal hole 76 in the shaft 30 which communicates with an annulus formed between the bore of said shaft and a tube 78. At the right hand end of and within the shaft 30 a transverse hole 80 is formed, said hole communicating through a transverse hole 82 in a tubular driven shaft 84, with a relief hole 86 in the housing 24.

The delivery valves 72 of the reaction or fixed pump cylinders 62 deliver to an annular groove 88 formed in the flanged face of the housing 24 whereby all the reaction pump delivery valves are connected by a hole 90 to a fixed piston 92.

The inlet valves 74 of the driving pump cylinders 70 communicate by holes 94 with a diagonal hole 96 which in turn communicates with the interior tube 78 in the shaft 30 and thence through the radial hole 98 in the driven shaft 84 to a coinciding hole 100 in the housing 24. The suction valves 74 of the fixed or reaction pump cylinders 62 all communicate with a second annular groove 102 formed in the joint face of the housing 24, and with holes 104, 106.

In segment A will be seen a gear pump 108 having a delivery connection 110 which is connected by external pipes (not shown) with the holes 106 and 100. In this way primary oil pressure from the pump 108 is supplied to the inlet valves of all the pump cylinders whereby the pistons are maintained in contact with their respective cams, the hydraulic systems are kept free of air, and whereby the system is pre-loaded; the amount of pre-loading being determined by the setting of a spring 112 of a relief valve 114. The pump is driven by the diagonal shaft 116 which is equipped at its upper end with a helical pinion 118 shown dotted in Fig. 1 (as it is there out of true projection) and this pinion meshes with the helical gear 14 secured to the crankshaft as previously described.

Mounted for free rotation upon the shaft 30 is a planet cage 120 equipped with planet roller spindles 122 by which planet rollers 124, 126 are rotatably mounted for planetization in contacting pairs as shown. Engaging the rollers 126 is a distortable crown faced driven disc 128 set into a heavy carrier member 130 which is slotted as seen at 132 (segment C, Fig. 2) to comprise a large number of segments which are individually rigid but collectively distortable for rocking action of the driven disc whereby the contact is transferred from one end of the rollers 126 to the other.

The outer periphery of the disc carrier 130 is splined as shown at 134 into the rim 136 of a driven member 138, which has a cylinder portion 140 slidable and rotatable relative to the fixed piston 92, and this driven member is integral with the driven shaft 84 on the end of which is splined a flange member 142 to which the propeller shaft universal joint would be attached in the usual way in the case of an automobile transmission. The inner periphery of the disc carrier 130 is backed up by a pressure member 144, seated on the shaft 30 against a shoulder 146.

The piston and cylinder combination 92, 140, is connected by a hole 148 to a relief hole 150, and this hole 150 and the companion relief hole 86 (already described as communicating with the piston 34 actuating the driving member 42) are provided with similar relief plungers 152, 154, which are restrained by a balance beam 156 with which is engaged the lower end of a control lever 158 rigid with a control shaft 160 which carries, exteriorly of the transmission, a control lever 162. This control lever has a plunger 164 loaded by a spring 166, and engages a quadrant 168 rigid with a cover 170 which is provided with adjustable stop pins 172 by which the maximum lift of the relief plungers 152, 154 may be adjusted. The control lever 162 further carries an adjustable stud 174 which abuts the end of a valve stem 176 in the high gear position shown, thereby forcing a valve 178 upon its seat and closing off communication between the primary pressure hole 106 and the hole 104 which communicates with the inlet valves of the reaction member hydraulic system.

The operation of this invention is as follows:

As has been described in said co-pending applications, Serial Numbers 669,144 and 728,058, when contacting rollers, such as 124, 126 are mounted in a cage for planetization, complementary points on the rollers must travel at the same velocity. For example, in the one-to-one ratio position in which the parts are shown, the contact of the distortable driven member 128 with the roller 126 is at the point designated 180 which is opposite to the point 41 of contact of the driving member with the companion roller 124. Hence, the driven disc 128 and the associated parts are restrained to equal rotation with the driving member 42, regardless of the speed of planetization of the rollers 124, 126, with the cage 120.

It is a principle in any transmission having a reaction member (in a conventional gear transmission the reaction member may be the layshaft bearings) that, when the transmission is in one-to-one ratio, there is no net torque reaction upon the reaction member, or indeed upon the housing of the transmission, regardless of the complications of the gearing or other means by which the one-to-one ratio is achieved. Under these conditions, then, there will be no driving effort between the reaction member 50 and the rollers 124, and the rollers, if left to themselves, will cease to planetize, giving direct drive in high without rolling contact. To ensure this, however, it is necessary to relieve the reaction member pistons 60 of the primary pressure, which is done by closing the valve 178 as already described, whereupon the springs 54 will urge the driving member 42 and therefore the planet assembly and the driven member assembly to the right, moving the rollers 124 out of contact with the reaction member 50 as shown, thus avoiding any wear which might occur due to incidental contact at this point in the direct drive condition. This movement is limited by a shoulder formed on the driven shaft 84.

It will be obvious that, in the direct drive condition shown, the contact pressures of the driving member 42 on the rollers 124 are exactly equal and opposite to the contact pressures at the point 180 between the driven member 128 and the rollers 126, whereby the reaction member 50 is automatically relieved of contact loads as is appropriate to the high gear condition. However, so soon as the driven member 128 is distorted to move its contact point outwardly along the rollers 126, then a proportion of the contact loads devolves upon the reaction member 50, and it is a feature of this invention that the distribution of contact loads between the driving member contact 42 and the reaction member contact 50 is always in proportion to the driving effort at these respective points. Thus, if the driven disc 128 be flexed until its contact with the rollers 126 occurs at the point 182 opposite to the contact 51 of the reaction member, then, the contact loads are exclusively on these points and the driving member contact 42 is relieved of load (except that due to the primary pressure on the piston 34 of the driving member 42). The reaction member 50 being the "fixed member" of the transmission, the driven disc 128 is also held to zero speed giving one-to-zero ratio in which the torque ratio is infinite, whence there can be no torque at the driving member contact 42 except that due to the friction of the parts, and slippage at the driving member contact under this incidental resistance is prevented by the pre-loading pressure.

It should be noted that the cam driven pump units, already described, comprise respectively the driving connections between the engine flywheel 16 and the driving member 42, and the anchoring connection between the reaction member 50 and the housing. From this it follows that the hydraulic pressures generated by the respective pumps must, at any instant, be proportional to the driving torque on the associated member. These respective hydraulic pressures are effective upon the pistons which produce the contact pressures on the respective members, wherefore, these contact pressures vary in proportion to the driving effort at the respective contacts, under all variations of driving effort and ratio position.

As will be seen, there are two torque responsive hydraulic pressure systems, one due to the pump pistons 66 of the system associated with the driving member 42, and one due to the pistons 60 of the reaction member system, these pressures acting respectively on the contact pressure piston 34 of the driving member 42, and on the contact pressure piston 92 of the driven member 138.
The contact load from the piston 92 is effective, through the driven member 138, on the outer periphery of the driven disc 128; the reaction pressure on the "fixed member" 50 being transmitted through the housing 24. Similarly, the contact pressure generated at the piston 34 is effective, through the shaft 30 and the pressure member 144, on the inner periphery of the driven disc 128; the reaction being taken by the driving member 42.

It should now be obvious that the ratio between these respective pressures determines the position of the rocking contact face of the driven member 128 on the rollers 126, and therefore determines the ratio position of the transmission.
For example, when the gross pressure on the driving member piston 34 equals the gross pressure on the driven member piston 92 the contact position must be such as to give equal reaction at the inner and outer peripheries of the driven members 128, i. e., the contact point must be at the mid-length of the rollers.

It should further be obvious that the ratio of pressures in the two hydraulic systems depends upon the position of the control lever 158 which comprises a movable fulcrum for the balance beam 156 determining the relative load upon the relief plungers 152, 154 and hence the relative pressures in the two hydraulic systems. This control, however, determines only the relation of these pressures; the magnitude of these pressures depending upon the magnitude of the torque transmitted by the torque responsive pump systems.

The pistons 34, 92 and their associated cylinders 38, 140 perform combined functions as follows:

(a) They apply the torque responsive contact pressures to the associated drive members;

(b) They move the members to the ratio dictated by the position of the control levers 162, 158, and (c) They comprise hydraulic anti-friction thrust bearings whereby the contact pressure loads on the associated rotating members are taken. These latter loads are of great magnitude and have been a source of wear and friction loss in transmissions where ball thrust bearings have been used.

At several rotating or sliding contacts in the hydraulic systems piston rings have been indicated to minimize leakage, but these have not been referred to by specific reference numerals as their function is obvious.

It will also be noted that the contact point of the driven member 138 with the driven disc carrier 130 is beyond the point 182 which gives the one-to-zero ratio position. The purpose of this construction is to permit the contact of the driven disc 128 with the roller 126 to be brought beyond the point 182 to give reverse drive ratios.

On account of the equal radii of the rollers 124 at the respective points of contact with the driving member 42 and of the "fixed" member 50 the operativeness of this type of transmission has been impugned, requiring the construction of a demonstration model in connection with a previous application. If the members 42 and 50 were also of equal diameter, the allegation that the driving member 42 could not rotate, without slippage, while the member 50 is stationary, would be true. Actually, however, the driving member 42 is about one-half the diameter of the "fixed" member 50, under which conditions the cage 120 will planetize backwards with respect to the driving member 42, at equal speed to the forward rotation of that member, as long as non-slipping contact with both members is maintained. These members are functionally analagous to bevel gears, the driving ratio of which is determined by their pitch cone angle. The pitch cone angle of the driving member 42 is indicated by the dotted line 41, 43 and, were the rollers to be coned or stepped so that the contact of the "fixed" member 50 fell on an extension of this line, then the device would be inoperative as alleged. It will be ovious, however, that the pitch cone angle of the fixed member 50 is one-half that of the driving member 42 in the case where the diameter ratios are two-to-one, and the rollers parallel.

It is, of course, well known that when a pair of gears on one shaft are meshed with a common pinion on a parallel shaft, then there can be no relative rotation between the gears. However, in a planetary organization, where the axis of the common pinion is at right angles to that of the gears the case is entirely non-analagous. This organization of the present invention, however, appears to be new to those who have examined it, and the following method of analysis developed by the inventor is added in further explanation.

In a planetary roller such as 124 it is obvious that the axis itself is in motion at increasing velocities towards the outer end, while the point 43 of intersection with the main axis is fixed (with parallel shafts all points on the planet axis have equal velocity). Further, the point 51 on the circumference of the roller, in contact with the fixed member 50, is also instantaneously fixed; it therefore follows that all points on the roller on the line 43, 51 are instantaneously stationary, this line comprising an instantaneous fixed inclined axis about which the roller may be considered as rotating at any instant.

If we now consider the radial line 41, 45 drawn from the axis of the roller to the driving member contact we see that this line is bisected by the instantaneous axis 43, 51 (in the case where the driving member diameter is one-half of the driven member diameter), thus the instantaneous axis may be considered as a fulcrum for the element 41, 45 of the roller, so that the point 45 must be moving at equal velocity, but in the opposite direction to the point 41. In other words, the roller axis planetizes backwards at driving-member speed whenever non-slipping contact is maintained at the driving and fixed member contacts. In the special case of one-to-one ratio where the contact loads are exclusively upon the driving members contact 42, and where the driven member contact 50 is relieved, there is nothing to urge this rearward planetization, and the rollers will assume unitary non-rolling rotation with the other parts, about the main axis, due to their frictional resistance to rolling contact. This inherent "direct drive in high" is one of the features of this novel organization.

It will be seen that the torque responsive oil pressure pumps are actuated by creepage between the parts they drivably connect, which creepage rate corresponds to the rate of leakage, which is thereby automatically made up, since the displacement due to leakage of those pump plungers which are on their delivery strokes is matched by the induction capacity of those plungers which are then on their inlet strokes. It is contemplated that the creeping speed will be a small fractional percentage of the rotational speed of the parts. It will increase momentarily when the control is moved, while the associated pumps displace the quantity of oil needed to move the appropriate contact pressure piston to its new position. When the pressure in the system reaches the ratio dictated by the control position, then leakage at the control relief valves will cease.

The entire hydraulic systems are at all times maintained full of oil so that sudden reversal of driving load results in reversing one-half of the pump pistons from inlet to delivery stroke creepage, and the other half vice versa, without any change in the ratio of the hydraulic pressure in the respective systems as set by the control lever position; the reversal being thus hydraulically cushioned against backlash.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a transmission having members to be driven and loaded into contact, in combination, hydraulic systems for the respective members each including a pump comprising a drive connection to its associated member, a controllable contact pressure thrust means for each member, and control means adapted to proportion the hydraulic pressures in the respective systems.

2. In a transmission, in combination, an hydraulic pump having a restricted delivery, a transmission member driven by said pump, and a thrust means subject to the pressure generated by said pump and adapted to apply pressure to said member.

3. In a transmission, in combination, drive members, pumps adapted to resist the driving torque on each member, pistons adapted to apply contact pressures to the respective drive members, said pistons being at all times subject to the pressures developed by said pumps, and control means adapted to proportion the pressure ratio.

4. In a transmission having members subject to varying torque reactions, pumps associated with the respective members so as to be subject to said torque reactions, ratio control thrust means subject to the pressure generated by the respective pumps, said ratio control thrust means being adapted to apply contact pressure to the respective members, and means to vary the relation between the pressures acting upon the respective members.

5. In a transmission, in combination, a driven member movable axially for ratio change and comprising parts organized for relative rotational creepage, a pump resisting said creepage, and a piston adapted to effect said movement from pressure generated by said pump.

6. In a transmission, in combination, a two-part drive means, a coupling comprising a pump, drivably connecting said two parts for relative rotational creepage, and a piston actuated by pump pressure to contact load said transmission.

7. In a transmission, in combination, a two-part drive means, a coupling comprising a pump drivably connecting said two parts for relative rotational creepage, and a piston actuated by pump pressure to position said drive means.

8. In a transmission, in combination, a pump, a two-part drive member drivably connected by said pump for relative rotational creepage of its parts, and a piston actuated by pump pressure to move said member.

9. In a transmission, in combination, a pump, means drivably connected by resistance of said pump to relative rotational creepage, and a piston actuated by pump pressure organized to function as a thrust bearing for said means.

10. In a transmission, in combination, drive members, opposed hydraulic pistons adapted to move said members for ratio change, and means to control the relative but not the gross pressures on said pistons so as to control the ratio change.

11. In a transmission, in combination, drive members, hydraulic pistons adapted to move said members for torque ratio change, means to apply hydraulic pressure to said pistons in direct proportion to the driving load on the associated members, and a control means adapted to change the relative hydraulic pressures on said pistons without changing said driving load proportionality.

12. In a transmission, in combination, a roller mounted for planetization about an axis, a member concentric with said axis having roller driving contact, and hydraulic means organized for shift of said contact lengthwise said roller through movement of said member.

13. In a transmission, in combination, a roller mounted for planetization about an axis, a member having roller driving contact, and an hydraulic piston movable lengthwise said planet axis, said piston by its movement being adapted to shift said contact and by such shift effect a ratio change.

14. In a transmission, in combination, a pump organized to hydraulically resist creepage of its parts, a transmission drive member driven through said pump, and a contact pressure thrust means for said drive member movable under the influence of pressure generated by said pump.

15. In a transmission, in combination, a pump organized to hydraulically resist creepage of its parts, a transmission drive member driven through said pump, and a contact pressure thrust means for said drive member movable under the influence of hydraulic pressure.

16. In a transmission, in combination, members organized for ratio changing movement, driving means for said members including pumps, thrust means subject to and movable under the influence of the pressure from said pumps, and means to control the relationship between said pressures to effect such movement.

17. In a transmission, in combination, a reaction member organized for rotational creepage relative to a fixed transmission part, and a connection between said member and said fixed part comprising a concentric plurality of hydraulic cylinders having axes extending radially out from the axis of said member.

ROLAND CHILTON.